(12) United States Patent
Guttormson (10) Patent No.: US 7,914,016 B2
(45) Date of Patent: Mar. 29, 2011

(54) HAND TRUCK FOR TRANSPORTING A PLURALITY OF OBJECTS

(76) Inventor: Patrick Stephen Guttormson, Jacksons Point (CA)

( * ) Notice: Subject to any disclaimer, the term of this patent is extended or adjusted under 35 U.S.C. 154(b) by 581 days.

(21) Appl. No.: 12/045,795

(22) Filed: Mar. 11, 2008

(65) Prior Publication Data
US 2009/0230645 A1 Sep. 17, 2009

(51) Int. Cl.
B62B 1/26 (2006.01)
(52) U.S. Cl. .................... 280/47.19; 280/47.28; 211/74
(58) Field of Classification Search .................. 280/645, 280/651, 652, 654, 659, 43.1, 47.131, 47.17, 280/47.19, 47.23, 47.24, 47.26, 47.34, 47.35, 280/79.11, 79.2, 79.3, 79.5, 79.6; 211/74
See application file for complete search history.

(56) References Cited

U.S. PATENT DOCUMENTS

| | | | | |
|---|---|---|---|---|
| 1,103,689 A | * | 7/1914 | Russell | 280/79.5 |
| 2,763,383 A | * | 9/1956 | McCoy | 414/542 |
| 3,019,916 A | * | 2/1962 | Malcher | 206/596 |
| 3,149,726 A | * | 9/1964 | Magers | 211/134 |
| 3,436,093 A | * | 4/1969 | Ruffley, Jr. | 280/47.27 |
| 4,143,784 A | * | 3/1979 | Frahm et al. | 215/12.1 |
| 4,418,969 A | * | 12/1983 | Hettman | 312/249.9 |
| 4,431,107 A | * | 2/1984 | Bergstrom et al. | 211/59.4 |
| 4,627,542 A | * | 12/1986 | Fredrickson | 211/150 |
| 5,104,135 A | * | 4/1992 | Sheets | 280/47.19 |
| 5,123,666 A | * | 6/1992 | Moore | 280/47.28 |
| D336,408 S | * | 6/1993 | Tersch et al. | D7/619.1 |
| 5,215,199 A | * | 6/1993 | Bejarano | 211/74 |
| 5,370,245 A | * | 12/1994 | Tersch et al. | 211/74 |
| 5,379,905 A | * | 1/1995 | Bustos et al. | 211/59.2 |
| 5,406,996 A | * | 4/1995 | Wagner et al. | 141/364 |
| 5,513,939 A | * | 5/1996 | Martin et al. | 414/447 |
| 5,579,930 A | * | 12/1996 | Brendle | 211/151 |
| 5,647,600 A | * | 7/1997 | Booras | 280/47.35 |
| 5,791,667 A | * | 8/1998 | Knoll | 280/47.19 |
| D399,625 S | * | 10/1998 | Murphy et al. | D34/21 |
| 5,846,043 A | * | 12/1998 | Spath | 414/343 |
| 5,853,181 A | * | 12/1998 | Booras | 280/47.35 |
| 5,913,527 A | * | 6/1999 | Hailston | 280/47.28 |

(Continued)

Primary Examiner — J. Allen Shriver, II
Assistant Examiner — Jacob Meyer
(74) Attorney, Agent, or Firm — Perry + Currier Inc.

(57) ABSTRACT

A hand truck for transporting a plurality of objects is provided. The hand truck comprises a first frame portion and a second frame portion, each of which comprises: a first rail and a second rail, structurally joined proximal a handle end of each the rail; and a plurality of object supporting bars extending from the first rail to the second rail, each of the plurality of object supporting bars structurally supported by the first rail and the second rail, and separated from an adjacent object supporting bar by a distance approximate a stacking dimension of one of the plurality of objects. The second frame portion is laterally spaced from the first frame portion by an object supporting distance, such that the plurality of object supporting bars of the first frame portion and the plurality of object supporting bars of the second frame portion form a plurality of pairs of object supporting bars, each of the plurality of pairs of object supporting bars being substantially parallel and enabled to support at least one of the plurality of objects when the hand truck is in an upright position. The hand truck further comprises a handle portion proximal to, and structurally joining, a handle end of the first frame portion and a handle end of the second frame portion. The hand truck further comprises a wheel assembly joining the distal ends of each of the first rails of each of the first frame portion and the second frame portion.

25 Claims, 9 Drawing Sheets

U.S. PATENT DOCUMENTS

| | | | |
|---|---|---|---|
| 6,003,654 A * | 12/1999 | Webber et al. | 198/408 |
| 6,047,866 A * | 4/2000 | Brown | 222/608 |
| 6,135,297 A * | 10/2000 | DeShazo et al. | 211/74 |
| 6,189,720 B1 * | 2/2001 | Gillispie | 220/571 |
| 6,247,710 B1 * | 6/2001 | Luberda | 280/47.28 |
| 6,290,074 B1 * | 9/2001 | Syvuk et al. | 211/74 |
| 6,302,414 B1 * | 10/2001 | Berthiaume et al. | 280/47.18 |
| 6,511,027 B1 * | 1/2003 | Yu | 248/146 |
| 6,536,612 B2 * | 3/2003 | Flores | 211/85.22 |
| 6,659,476 B2 * | 12/2003 | Weida | 280/47.19 |
| D485,450 S * | 1/2004 | Smith | D6/432 |
| 6,811,042 B2 * | 11/2004 | Kelly et al. | 211/74 |
| 6,851,563 B1 * | 2/2005 | Lipari | 211/74 |
| 7,168,714 B2 * | 1/2007 | Gibbs | 280/47.34 |
| 7,195,257 B2 * | 3/2007 | Stoneback et al. | 280/79.6 |
| 7,628,406 B1 * | 12/2009 | Thomas et al. | 280/47.19 |
| 7,669,738 B1 * | 3/2010 | Byers | 222/164 |
| 7,690,515 B2 * | 4/2010 | Thibodeau | 211/11 |
| 2001/0011802 A1 * | 8/2001 | Meabon | 280/47.18 |
| 2002/0043509 A1 * | 4/2002 | Lajeunesse et al. | 211/59.2 |
| 2004/0026346 A1 * | 2/2004 | Kelly et al. | 211/74 |
| 2004/0113529 A1 * | 6/2004 | Goldin | 312/72 |
| 2006/0131825 A1 * | 6/2006 | Stoneback et al. | 280/79.6 |
| 2006/0208442 A1 * | 9/2006 | Hellermann | 280/79.3 |
| 2007/0221593 A1 * | 9/2007 | Apps | 211/74 |
| 2008/0012256 A1 * | 1/2008 | Wandrei et al. | 280/47.34 |
| 2008/0245436 A1 * | 10/2008 | Lang | 141/2 |
| 2010/0225077 A1 * | 9/2010 | Plesh et al. | 280/47.23 |

* cited by examiner

HAND TRUCK FOR TRANSPORTING A PLURALITY OF OBJECTS

FIELD

The specification relates generally to hand trucks, and specifically to a hand truck for transporting a plurality of objects.

BACKGROUND

Distribution of drinking water to homes and businesses is often done via large cylindrical glass or plastic bottles with a narrow neck, adapted to fit into a dispensing unit, with each bottle holding a considerable volume of water, for example 3.5 gallons, 5 gallons etc. Consequently a full bottle is both heavy (e.g. 25 to 50 lbs or more) and awkward, making transport of the bottles problematic, especially as the bottles are hauled from a truck to the dispensing unit. For example, a driver may deliver 5 bottles to a business located on an upper floor of a building and necessarily must transport the 5 bottles from a truck, into the building and up to the business via an elevator. If the water bottles are stackable, a standard hand truck may sometimes be used, however there is no stability to this arrangement.

U.S. Pat. No. 5,104,135 teaches a wheeled handcart for transporting water bottles. Support appendages extend forward from a curved frame, spaced apart to accept and support up to four, five gallon water bottles. However, the curved frame supports the weight of all four bottles and will necessarily be constructed from a sturdy but heavy material. The weight of the handcart, therefore, becomes problematic for the driver as the handcart must generally be lifted in and out of a truck by hand. Furthermore, the weight of each bottle is translated to the frame via a pair of connection points which are generally off-centre from the center of mass of the water bottles and are hence subject to undue torque/stress.

U.S. Pat. No. 5,913,527 teaches a hand truck in which a pair of laterally spaced side rails are laterally connected by cross-wise braces to form a hand truck frame, and, a plurality of trays spaced along the frame for carrying water bottles oriented laterally. The lateral orientation of the cylindrical water bottles is problematic as the water tends to slosh along the cylindrical axis of each bottle, and hence the centre of mass of the loaded hand truck also shifts laterally, which can be awkward for the driver. Further, the hand truck is preferably constructed from aluminum to reduce weight as the frame is quite bulky: a steel frame would result in a hand truck that is too heavy, however the use of aluminum increases the cost of the hand truck considerably.

SUMMARY

An aspect of the specification provides a hand truck for transporting a plurality of objects. The hand truck comprises a first frame portion and a second frame portion, each of which comprises: a first rail and a second rail, structurally joined proximal a handle end of each the rail; and a plurality of object supporting bars extending from the first rail to the second rail, each of the plurality of object supporting bars structurally supported by the first rail and the second rail, and separated from an adjacent object supporting bar by a distance approximate a stacking dimension of one of the plurality of objects. The second frame portion is generally laterally spaced from the first frame portion by an object supporting distance, such that the plurality of object supporting bars of the first frame portion and the plurality of object supporting bars of the second frame portion form a plurality of pairs of object supporting bars, each of the plurality of pairs of object supporting bars being substantially parallel and enabled to support at least one of the plurality of objects when the hand truck is in an upright position. The hand truck further comprises a handle portion proximal to, and structurally joining, a handle end of the first frame portion and a handle end of the second frame portion. The hand truck further comprises a wheel assembly joining the distal ends of each of the first rails of each of the first frame portion and the second frame portion.

A wheel end of the first rail may be separated from a supporting end of the second rail by a hand truck supporting distance, each of the wheel end of the first rail and the supporting end of the second rail distal from the handle end, the hand truck supporting distance comprising a distance that enables the hand truck to freely stand when the hand truck is in an upright position, the hand truck being supported by the wheel assembly and the supporting ends of each the second rail.

The supporting end of each the second rail of the first frame portion and the second frame portion may be structurally joined by a toe strip.

Each of the plurality of object supporting bars may be structurally joined to the first rail and the second rail.

For each of the first frame portion and the second frame portion, the first rail and the second rail may form an angle, a narrow end of the angle located proximal the handle end of each the rail, a wide end of the angle formed by a wheel end of the first rail and a supporting end of the second rail.

For each of the first frame portion and the second frame portion, the first rail and the second rail may be structurally joined proximal the handle end of each the rail by one of the plurality of object supporting bars.

For each of the first frame portion and the second frame portion, the first rail and the second rail may be structurally joined proximal the handle end of each the rail by at least one of a structural fastener and a weld.

For each of the first frame portion and the second frame portion, the first rail and the second rail may be structurally joined proximal the handle end of each the rail by a joining portion which substantially separates the first rail and the second rail at the handle end of each the rail. The first rail and the second rail may also be substantially parallel.

Each of the plurality of pairs of object supporting bars may be joined by a lining portion adapted to accept and support the one of the plurality of objects, the weight of the one of the plurality of objects being translated to the first frame portion and the second frame portion by at least one of a pair of the object supporting bars and an associated lining portion. The lining portion may comprise a belly strap extending between each of the plurality of pairs of object supporting bars, the belly strap for engaging at least a portion of the one of the plurality of objects. Each of the plurality of objects may comprise at least one of glass and plastic, and the lining portion may be enabled to prevent damage to the glass and plastic. The lining portion may comprise a plastic material. The lining portion may comprise at least one of at least one of high density polyethylene (HDPE), polyvinyl chloride (PVC) and Kevlar. The lining portion may comprise a flexible lining portion enabled to grip the one of the plurality of objects. Each of the plurality of objects may comprise a five gallon water bottle. The lining portion may comprise an object abutment portion extending from an end adjacent the first rail, the object abutment portion for preventing the one of the plurality of objects from sliding towards the first rail of each of the first frame portion and the second frame portion and.

Each of the plurality of object supporting bars may be tilted towards the handle end of the first rail, forming an acute angle with the first rail, such that the one of the plurality of objects slides towards the first rail when supported by one of the plurality of pairs of object supporting bars, when the hand truck is in an upright position.

Each of the plurality of object supporting bars may comprise an object abutment portion extending from an end adjacent the first rail, the object abutment portion for preventing the one of the plurality of objects from sliding towards the first rail of each of the first frame portion and the second frame portion.

The hand truck may further comprise a second handle portion proximal to, and structurally joining, a handle end of the first frame portion and a handle end of the second frame portion, wherein the handle portion enables a user to apply a moment of force to the handcart to disengage the supporting ends of each the second rails from the ground and ergonomically transport the hand cart via the wheel assembly when the hand cart is in a substantially upright position, and the second handle portion enables a user to ergonomically transport the hand cart via the wheel assembly when the hand cart is in a substantially tilted position. When the one of the plurality of objects is supported by an uppermost pair of object supporting bars, the second handle portion may be further enabled to prevent another one of the plurality of objects stacked on the one of the plurality of objects from sliding between the first rail of each of the first frame portion and the second frame portion.

The plurality of pairs of object supporting bars may comprise a bottommost pair extending from the wheel end of each the first rail, an uppermost pair extending proximal the handle end of each the first rail, and at least two middle pairs evenly spaced between the bottommost pair and the uppermost pair.

The first frame portion and the second frame portion may comprise at least one of steel and aluminum.

The first rail and the second rail may be structurally joined proximal a handle end of each the rail via a hinge, and the plurality of object supporting bars extending from the first rail to the second rail are structurally joined to the first rail via another hinge.

The hand truck may further comprise at least one of a lining portion, a spool supporting portion, a box or a tray extending between at least one of the pairs of object supporting bars.

BRIEF DESCRIPTION OF THE DRAWINGS

Embodiments are described with reference to the following figures, in which.

DETAILED DESCRIPTION OF THE EMBODIMENTS

Figure 1:
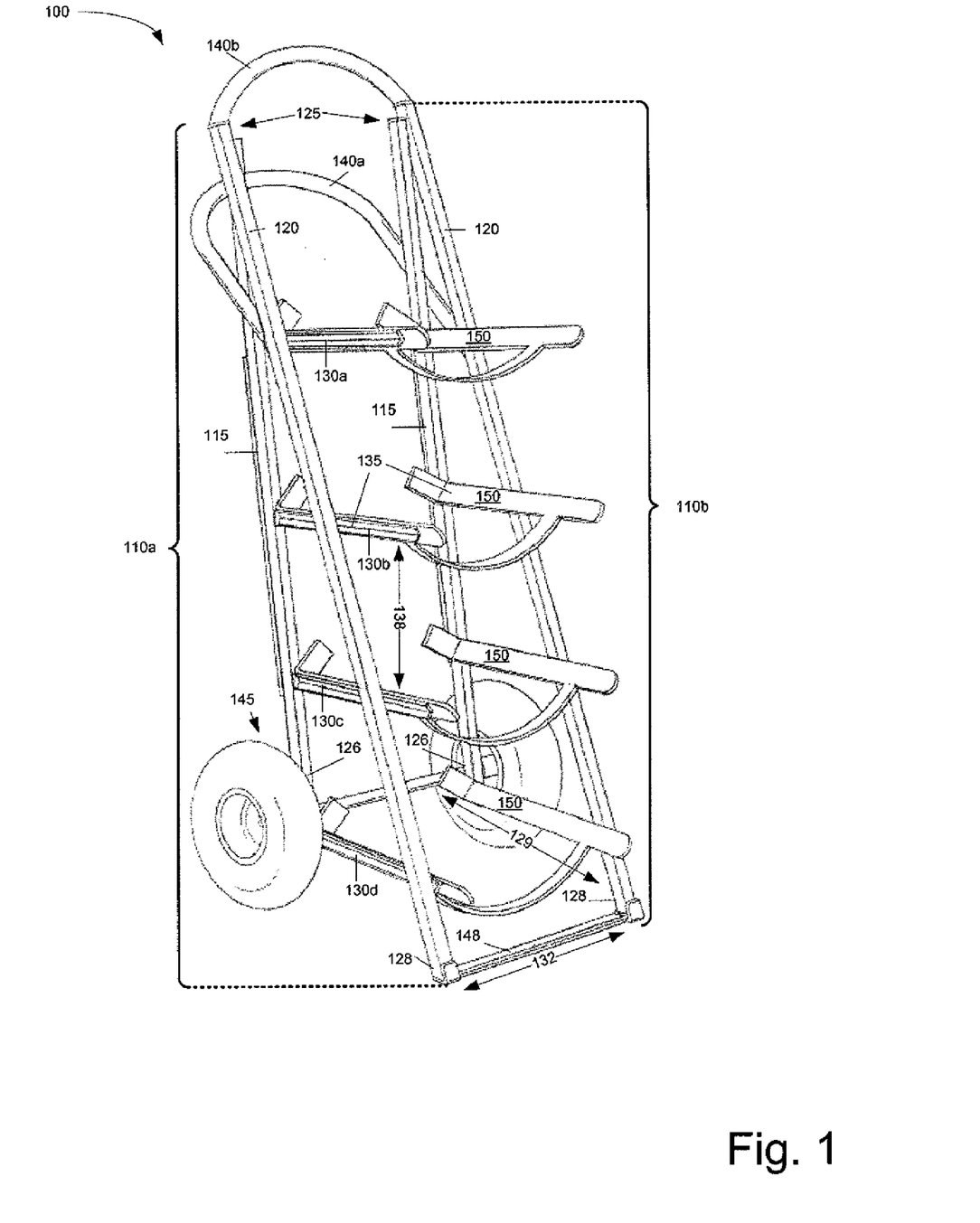
FIG. 1 depicts a perspective view of a hand truck for transporting a plurality of objects, according to a non-limiting embodiment.

FIG. 1 depicts a perspective view of a hand truck 100 for transporting a plurality of objects, according to a non-limiting embodiment. The hand truck 100 generally comprises a first frame portion 110$a$ and a second frame portion 110$b$, generically referred to as a "frame portion 110" and collectively as "frame portions 110". Each frame portion 110 comprises a first rail 115 and a second rail 120 which are structurally joined, proximal a handle end 125 of each of the first rail 115 and the second rail 120. The structural nature of the join between the first rail 115 and the second rail 120 proximal the handle end 125 will be described below.

Further, a wheel end 126 of the first rail 115 is separated from a supporting end 128 of the second rail 120 by a hand truck supporting distance 129 (described below). Each of the wheel end 126 of the first rail 115 and the supporting end 128 of the second rail 120 is distal from the handle end 125.

Each frame portion 110 further comprises a plurality of object supporting bars 130$a$, 130$b$, 130$c$ and 130$d$, generically referred to as an "object supporting bar 130" and collectively as "object supporting bars 130", extending from, the first rail 115 to the second rail 115, the object supporting bars 130 being structurally supported by the first rail 115 and the second rail 120. In some embodiments each of the plurality of object supporting bars 130 are structurally joined to the first rail and the second rail 130, for example via a weld or a suitable fastener. In the perspective of FIG. 1, only object supporting bars 130 of the first frame portion 115 are visible, the object supporting bars 130 of the second framer portion 110$b$ being hidden by an optional lining portion 150, described below. However it is understood that the hand truck 100 is generally symmetrical about a centre longitudinal plane, and hence object supporting bars 130 also extend from the second frame portion 120. Further, while the embodiment depicted in FIG. 1 comprises four object support bars 130 for each frame portion, embodiments with greater or fewer object supporting bars 130 are within the scope of the present specification. In general, the number of object support bars 130 on each frame portion 110 is representative of the number of objects that are supportable by the hand truck 110.

The first frame portion 110$a$ and the second frame portion 100$b$ are laterally spaced by an object supporting distance 132 (discussed below) such that the plurality of object supporting bars 130 of the first frame portion 110$a$ and the plurality of object supporting bars 130 of the second frame portion 119$b$ form a plurality of pairs of object supporting bars 130, for example the pair 135 depicted in FIG. 1, each of the plurality of pairs of object supporting bars 130 being substantially parallel and enabled to support at least one of the plurality of objects, for example when the hand truck 100 is in an upright position. In some embodiments, each of the plurality of objects may have a longitudinal axis (for example see the water bottles of FIGS. 4, 5 and 6), and the pairs of object supporting bars 130 are generally configured to support at least one of the plurality of objects along the longitudinal axis, the longitudinal axis of object being generally parallel to the object supporting bars 130 when supported. However, in other embodiments, the pairs of object supporting bars 130 may be configured to support the plurality of objects along an axis other than a longitudinal axis, as described below.

In general, each of the plurality of the object supporting bars 130 are separated from an adjacent object supporting bar 130 along the associated frame portion 110 by an object stacking distance 138 approximate a stacking dimension of one of the plurality of objects. For example, in one non-limiting embodiment, as will be described below with reference to FIGS. 3 and 4, the plurality of objects may be water bottles that are to be transported via the hand truck 130, and supported by pairs of the object supporting bars 130. Hence, the object stacking distance 138 is such that a water bottle is stackable on each pair of object supporting bars 130, while enabling the stacking of another water bottle onto an adjacent pair of object supporting bars 130, without interference. In this embodiment, the object stacking distance 138 may approximately comprise a diameter of a water bottle. In some embodiments, the object stacking distance 138 may be such that water bottles stacked on adjacent pairs of object supporting bars 130 are in contact, while in other embodiments, the object stacking distance 138 may be such that water bottles stacked on adjacent pairs of object supporting bars 130 are separated. In yet further embodiments, each water bottle may be configured for stackability via interacting grooves and ridges, for example. In these embodiments, the object stacking distance 138 may be such that when water bottles are stacked on adjacent pairs of object supporting bars 130, the ridge of a water bottle may slide into a groove of the adjacent water bottle, the weight of each water bottle however being supported by the corresponding pair of object supporting bars 130. Hence, in these embodiments, the object stacking distance 138 is less than a diameter of a water bottle.

Similarly, the object supporting distance 132 is a distance that enables an object to be supported by a pair of object supporting bars 130, such as the pair 135. For example, in some embodiments the object supporting distance 132 is a distance that enables the water bottles to be supported by the pairs of the object supporting bars 130, along the length of the object supporting bars 130. Hence, in these embodiments, the object supporting distance 132 is less than the diameter of a water bottle. However, in some embodiments, as described below, each pair of object supporting bars 130 are joined by the optional lining portion 150, with each optional lining portion 150 adapted to accept and support one of the plurality of objects, the weight of one of the plurality of objects being translated to the first frame portion 110a and the second frame portion 110b by the object supporting bars 130. In these embodiments, the object supporting distance 132 may be approximately equal to or even greater than the diameter of a water bottle, the optional lining portion 150 providing the substantial engagement of the water bottle.

Turning now to the hand truck supporting distance 129, the hand truck supporting distance 129 comprises a distance that enables the hand truck 100 to freely stand when the hand truck 100 is in an upright position, the hand truck 100 being supported by the wheel assembly 145 and the supporting ends 128 of each of the second rails 120. In some embodiments, each of the supporting ends 128 of each of the second rails 120 of the first frame portion 110a and said second frame portion 110b are structurally joined by a toe strip 148, however embodiments of the hand truck 100 that do not include the toe strip 148 are within the scope of the present specification. If present, the toe strip 148 provides additional stability to the hand truck 100, and further enables a user loading or unloading the hand truck 100 to immobilize and/or stabilize the hand truck 100 by stepping on the toe strip 148. While the toe strip 148 depicted in FIG. 1 generally comprises a bar extending between each of the second rails 120, the configuration of the toe strip 148 is not particularly limiting. For example, in alternative embodiments, the toe strip 148 may further comprise a plate configured to extend along the ground when the hand truck 100 is freely standing.

The hand truck 100 further comprises at least one handle portion, such as handle portion 140a and 140b, proximal to, and structurally joining, a handle end of the first frame portion 110a and a handle end of the second frame portion 110b. In general the handle portion 140a enables a user to apply a moment of force to the handcart 100 to disengage the supporting ends 128 of each the second rails 120 from the ground and ergonomically transport the hand cart 100 via a wheel assembly 145 when the hand cart 100 is in a substantially upright position. The wheel assembly 145 further structurally joins the distal ends of each of the first rails 115 of each of the first frame portion 110a and the second frame portion 110b. Details of the wheel assembly 145 are described below with reference to FIG. 5. While not essential to present embodiments, the handle portion 140b enables a user to ergonomically transport the hand cart 100 via the wheel assembly 145 when the hand cart 110 is in a substantially tilted position, for example when the hand cart is being transported from a truck to building. However, it is understood that the hand cart 100 may also be transported via the handle portion 140a, when the hand cart 110 is in a substantially tilted position, and a hand truck 100 without the handle portion 140b are within the scope of the present embodiments.

Figure 2:
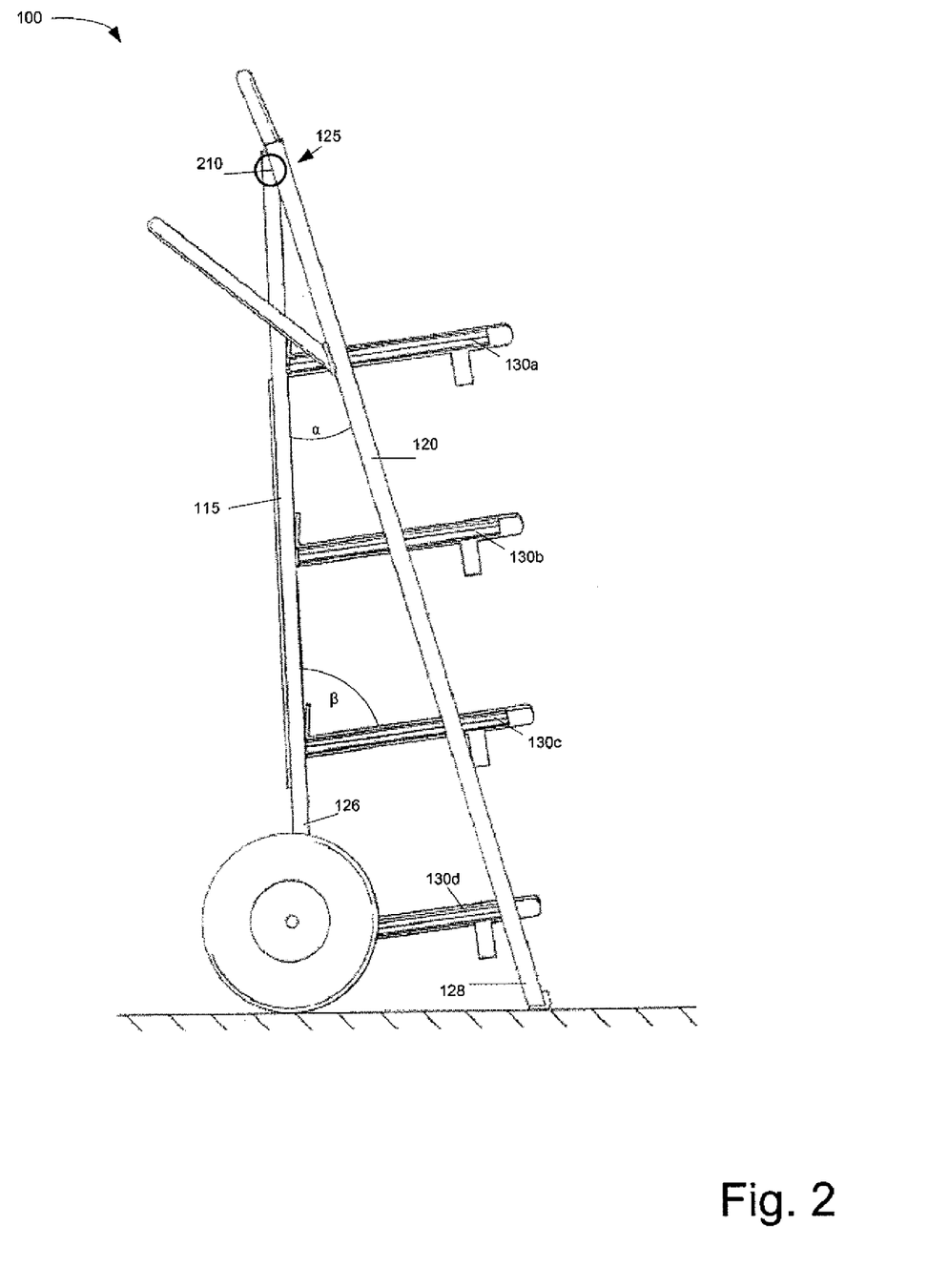
FIG. 2 depicts a side plan view of a hand truck for transporting a plurality of objects, according to a non-limiting embodiment.

Attention is now directed to FIG. 2, which depicts a side plan view of the hand cart 100 of FIG. 1, according to a non-limiting embodiment. In this embodiment, for each of the first frame portion 110a and the second frame portion 110b the first rail 115 and the second rail 120 form an angle α, a narrow end of the angle α located proximal the handle end 125 of each of the first rail 115 and the second rail 120, a wide end of the angle α formed by the wheel end 126 of the first rail 110 and the supporting end 128 of the second rail 120. Further, in these embodiments the second rail 120 is offset laterally from the first rail 115, and substantially overlaps the first rail 115 in the area 210, proximal the handle end 125.

Figure 3:
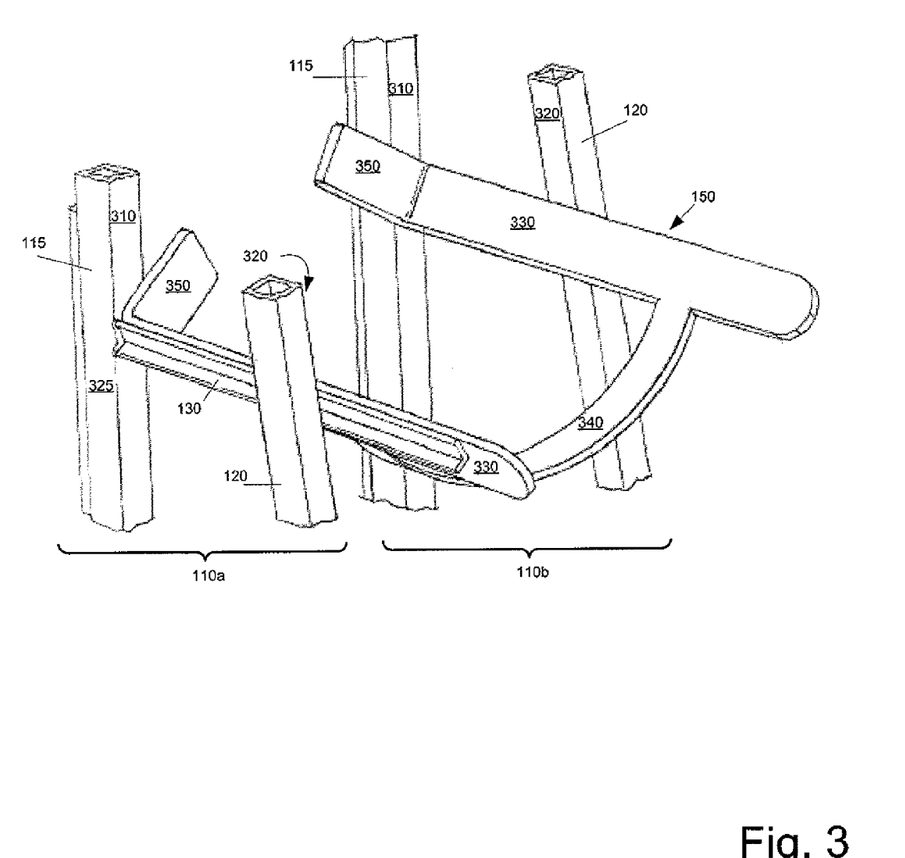
FIG. 3 depicts detail of an optional lining portion and an arrangement of the frame of a hand truck for transporting a plurality of objects, according to non-limiting embodiments.

However, the exact configuration of the second rail 120 relative to the first rail 115 is not strictly limiting, and other configurations of the second rail 120 relative to the first rail 115 are within the scope of present embodiments, as long as for each of the frame portions 110, each of the object supporting bars 130 are structurally supported by the first rail 115 and the second rail 120. This allows the weight of the plurality of objects to be structurally supported by both of the first rail 115 and the second rail 120 of each frame portion 110. Consequently, lighter gauge materials may be used to construct portions of the hand cart 110, for example lighter gauge metal tubing for the first rail 115 and the second rail 120, as depicted in FIG. 3 described below, saving on both weight and cost. Indeed, a successful prototype of the hand cart 110 of FIGS. 1 and 2, constructed primarily from steel tubing and angle iron as appropriate, and with four pairs of object supporting bars 130 for transporting four 5 gallon water bottles supported thereon, has proven to be approximately 10 lbs lighter than other commercially available hand carts configured to transport four, 5 gallon water bottles, for example handcarts taught in U.S. Pat. Nos. 5,104,135 and 5,913,527, including commercially available hand carts manufactured from the more expensive aluminum. However, the materials used to construct the hand cart 100 are not to be considered particularly limiting, the frame portions 110 being generally constructed from at least one of steel, iron, aluminum or any other appropriate material.

Further, as described above, the first rail 115 and the second rail 120 are structurally joined proximal the handle end 125 of each of the first rail 115 and the second rail 120 to provide stability in each frame portion 110, however the nature of the structural join is not particularly limiting. For example, in the embodiment depicted in FIGS. 1 and 2, the first rail 115 and the second rail 115 may be welded together in the area 210, located at the apex of the angle α. However, in other embodiments, the first rail 115 and the second rail 115 may be structurally together in the area 210 via any suitable structural fastener. A non-limiting example of a suitable structural fastener is a nut and bolt.

A person of skill in the art would understand that the first rail 115 and the second rail 120 are generally structurally joined proximal the handle end 125 of each of the first rail 115 and the second rail 120 via an uppermost object supporting bar 130a. In these embodiments, the structural join between the first rail 115 and the second rail 120 via an uppermost object supporting bar 130a may be sufficient to provide the desired stability in each frame portion 110, hence embodiments where the first rail 115 and the second rail 120 are not welded or fastened together at the area 210 are within the scope of the present specification. For example, in some embodiments the first rail 115 and the second rail 120 may not overlap proximal the handle end 125 (e.g. one or both of the first rail 115 and the second rail 120 may not extend enough towards the handle end 125 to overlap and/or the angle a may be such that the first rail 115 and the second rail 120 do not overlap), and the structural join provided via the uppermost object supporting bar 130a may provide sufficient stability in the respective frame portion 110.

In other embodiments where the first rail 115 and the second rail 120 do not overlap proximal the handle end 125, for each frame portion 110, the first rail 115 and the second rail 115 may be structurally joined proximal the handle end 125 of each of the first rail 115 and the second rail 120 by a joining portion (not depicted), which extends between the of the first rail 115 and the second rail 120 and is structurally joined to each. In some of these embodiments, the first rail 115 and the second rail 120 may be substantially parallel.

A person of skill in the art would further understand from FIG. 2 that each of the plurality of object supporting bars 130 is tilted towards the handle end 125 of the first rail 115, forming an acute angle β with the first rail 115, such that the one of the plurality of objects slides towards the first rail 115 when supported by one of the plurality of pairs of object supporting bars 130, when the hand truck 100 is in an upright position. This may be further observed in FIG. 4, described below.

Attention is now directed to FIG. 3 which depicts detail of one of the optional lining portions 150, which joins each pair of object supporting bars 130, as well as detail of the arrangement of an object supporting bar 130, the first rail 115, and the second rail 120, each according to a non-limiting embodiment. A person of skill in the art would understand from FIG. 3 that, in the depicted non-limiting embodiments, each of the first rail 115 and the second rail 120 comprises tubing of a substantially square cross-section, and that the object supporting bar 130 comprises angle iron, the object supporting bar 130 extending from an object side face 310 of the first rail 115, and structurally joined to the object side face 310. A person of skill in the art would further understand the second rail 120 is laterally offset from the first rail 115, away from the object supporting bar 130, such that the object supporting bar 130 is able to extend past the second rail 120, and is structurally joined to an inward lateral face 320 of the second rail 120. Hence, in the depicted non-limiting embodiment, the distance between the second rails 120, of each of the first frame portion 110a and the second frame portion 110b is larger than the distance between the first rails 115, of each of the first frame portion 110a and the second frame portion 110b, with an outward lateral face 325 of the first rail 115 being substantially in the same plane as the inward lateral face 320 of the second rail 120. However, other arrangements of the object supporting bar 130, the first rail 115, and the second rail 120 are within the scope of present embodiments.

The optional lining portion 150 depicted in FIG. 3 comprises a pair of bar lining portions 330, each of which line associated object supporting bars 130 in the pair of object supporting bars 130. The optional lining portion 150 of FIG. 3 is generally adapted accept and support generally cylindrical objects, such as a water bottle. Hence, the optional lining portion 150 of FIG. 3 further comprises a belly strap 340 which joins each of the bar lining portions 330, the belly strap 340 adapted to receive a curved wall of a cylindrical object. However, in other embodiments, the belly strap 340 may be adapted to accept and support objects of other shapes, for example objects with corners, objects which are curved but not cylindrical, and the like, the belly strap 140 being generally configured to mate with at least a portion of the object.

Hence, in embodiments that comprise optional lining portions 150, each of the plurality of pairs of object supporting bars 130 are joined by a lining portion adapted to accept and support the one of the plurality of objects, the weight of the one of the plurality of objects being translated to the first frame portion 110a and the second frame portion 110b by the object supporting bars 130, the object being substantially engaged by the optional lining portion 150. This may be seen more fully in FIGS. 4, 5 and 6, described below.

Each bar lining portion 330 is attached to the associated object supporting bar 130 via a suitable fastener. In some embodiments the suitable fastener comprises an adhesive. In other embodiments, the suitable fastener comprises a rivet joining the bar lining portion 330 and the associated object supporting bar 130. In further embodiments, the suitable fastener comprises a low profile screw and nut joining the bar lining portion 330 and the associated object supporting bar 130, the head of the screw holding the bar lining portion 330 in place on the object supporting bar 130. However, other suitable fasteners will occur to a person of skill in the art and are within the scope of present embodiments.

In some embodiments, however, the optional lining portion 150 may comprise only the belly strap 340, and not the bar lining portions 330, the belly strap 340 being attached to each of the pair of object supporting bars 130 via a suitable fastener.

In some embodiments, the optional lining portion 150 generally a material suitable for interaction with the object being supported. For example, in embodiments where each of the plurality of objects comprises at least one of glass and plastic (e.g. a glass water bottle or a plastic water bottle), the optional lining portion 150 is enabled to prevent damage to the glass and plastic. In some of these embodiments, the optional lining portion 150 comprises at least one of high density polyethylene, polyvinyl chloride (PVC) and kevlar, however other suitable materials are within the scope of present embodiments.

Figure 5:
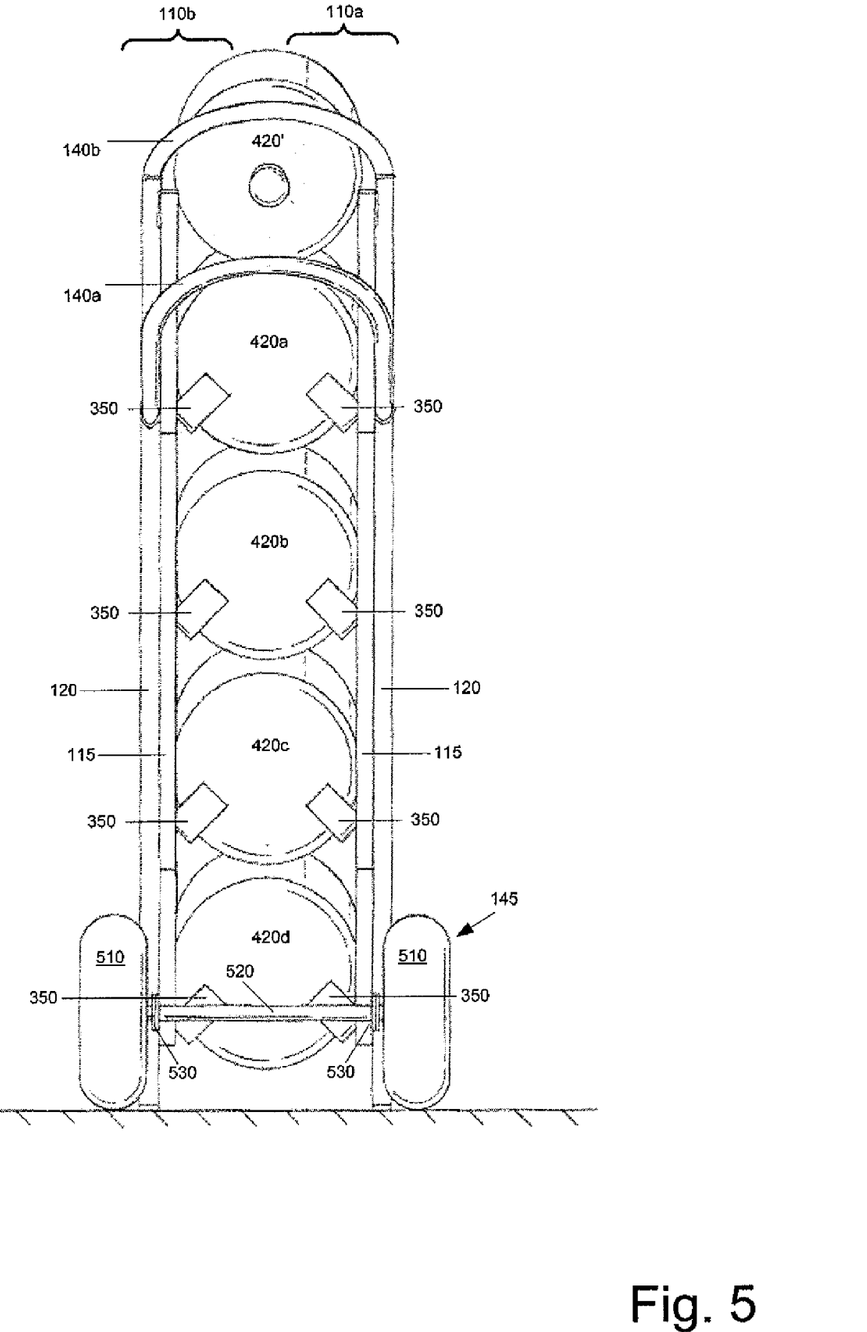
FIG. 5 depicts a rear plan view of a hand truck for transporting a plurality of objects, according to a non-limiting embodiment.
Figure 6:
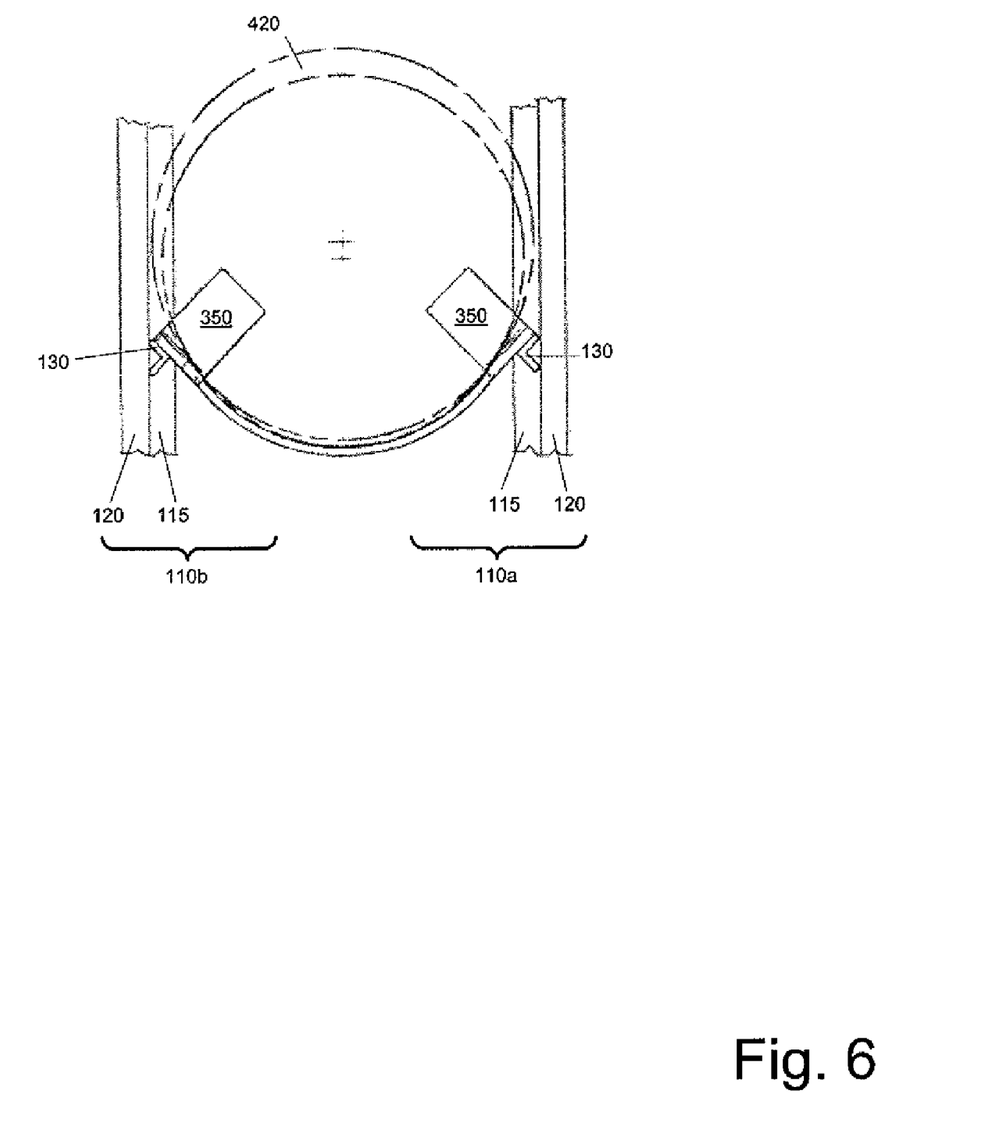
FIG. 6 depicts on object abutment portion of a hand truck for transporting a plurality of objects, according to a non-limiting embodiment.

In some embodiments, the optional lining portion 150 is generally flexible and hence enabled to grip the one of the plurality of objects. For example in some embodiments where the optional lining portion 150 of FIG. 3 comprises high density polyethylene, the weight of a water bottle placed onto the flexible optional lining portion 150 will generally cause the lining portion 150 to flexibly deform around the water bottle, in effect gripping the water bottle. Examples of embodiments where the optional lining portion 150 may be generally flexible are also depicted in FIGS. 4, 5 and 6.

As further depicted in FIG. 3, in some embodiments, at least one of each of the plurality of object supporting bars 130 and the optional lining portion 150 comprises an object abutment portion 350 extending from an end adjacent the first rail 115, the object abutment portion 350 configured to prevent the one of the plurality of objects from sliding towards the first rail 115 of each of the first frame portion 110a and the second frame portion 110b. This may be further observed in FIGS. 5 and 6, described below.

Figure 4:
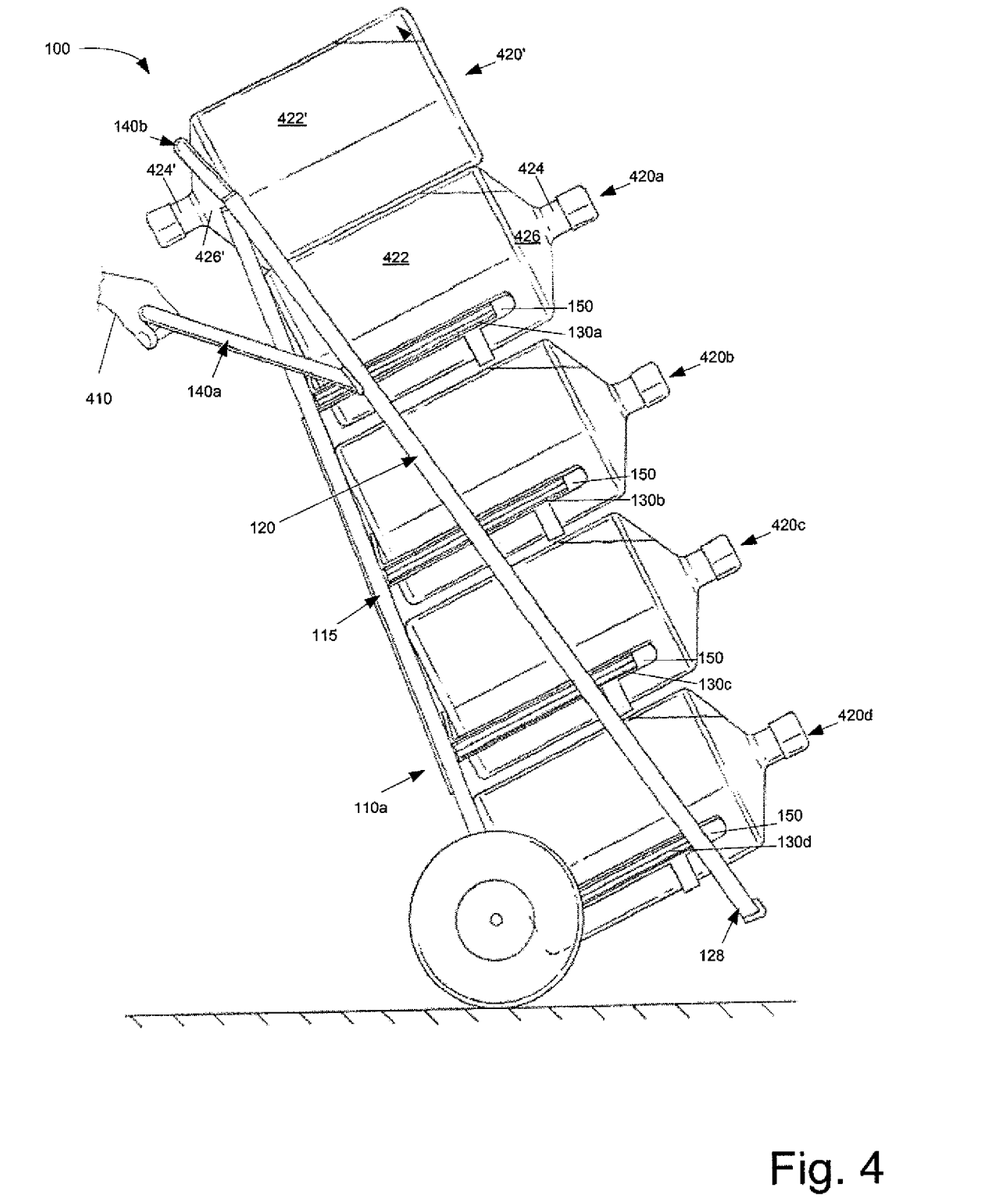
FIG. 4 depicts a side plan view of a hand truck for transporting a plurality of objects, in use, according to a non-limiting embodiment.

Attention is now directed to FIG. 4, which depicts a side plan view of the hand cart 100 of FIG. 1 in use, according to a non-limiting embodiment, the hand cart 100 being used to transport five, five gallon water bottles. From FIG. 4, a person of skill in the art would understand that a user, for example a user represented by the band 410, has stacked four, five gallon water bottles 420a, 420b, 420c and 420d (generically a water bottle 420 and collectively water bottles 420) on the hand cart 100, one on each of the pairs of object supporting bars 130. Each water bottle 420 generally comprises a generally cylindrical body portion 422, a generally cylindrical neck portion 424 of a smaller diameter than the body portion 422, and a joining portion 426 which extends from a joining end of the body portion 422 to a joining end of the neck portion 424, the joining portion 426 comprising a curved surface of generally decreasing diameter towards the neck portion 424. Each water bottle 420 has been accepted and is supported by a lining portion 150, the weight of each water bottle 420 being translated to the frame portions 110 by the object supporting bars 130 (only the first frame portion 110a being visible in FIG. 4). Further each water bottle 420 is oriented along a longitudinal axis (e.g. a cylindrical longitudinal axis) with respect to the object supporting bars 130.

While in the embodiment depicted in FIG. 4, the neck 424 of each water bottle 420 extends away from the handle portion 140a, in other embodiments, the orientation of each water bottle 420 when placed on the hand cart 100 is generally non-limiting, and the water bottles 420 may be placed on the hand cart 100 in an orientation where the neck 424 rests substantially between the first rail 115 of each fame portion 110, as desired.

A person of skill in the art would understand from FIG. 4 that the user has gripped the handle portion 140a (i.e. via the hand 410) and applied a moment of force to the hand cart 100 to disengage the supporting ends 128 of each the second rails 120 from the ground. A person of skill in the art would further understand that either the handle portion 140a or the handle portion 140b may used to transport the hand cart 100, depending on which handle portion 140 is more ergonomically comfortable for the user.

In the depicted embodiment, the user may prefer to use the handle portion 140a, however, as a fifth water bottle 420' has been stacked on top of the uppermost water bottle 420a. The water bottle 420' is similar to a water bottle 420 as described and also comprises a body portion 422', a neck portion 424', and a joining portion 426', each of which is similar to the body portion 422, the neck portion 424, and the joining portion 426, respectively. In this embodiment, the handle portion 140b is further enabled to prevent the water bottle 420' from sliding between the first rail 115 of each of the first frame portion 110a and the second frame portion 110b, by abutting the joining portion 426', the neck portion 424' extending towards the handle portion 140a. The configuration of the handle portion 140b is chosen accordingly, and is further depicted in FIG. 5, described below. In other embodiments, however, the handle portion 140b is further enabled to prevent the water bottle 420' from sliding between the first rail 115 of each of each of the first frame portion 110a and the second frame portion 110b, by abutting the bottom of the body portion 422', when the water bottle 420' is oriented in a direction opposite to that depicted in FIG. 4.

FIG. 5 depicts a rear plan view of the hand cart 100 of FIG. 1, according to a non-limiting embodiment, the hand cart 100 stacked with the water bottles 420 and the water bottle 420', as in FIG. 4, the hand cart 100 being in an upright position. FIG. 5 further depicts the interaction between each of the water bottles 420 and the object abutment portion 350. Indeed, a person of skill in the art would understand that pairs of object abutment portions 350 (one object abutment portion 350 associated with each object supporting bar 350), work in tandem to prevent a water bottle 420 from sliding towards the first rails 115. For example, in embodiments where the first rails 115 are laterally separated by a dimension that is larger than the diameter of the body 422 of a water bottle 420, the object abutment portion 350 prevents the water bottle 420 from sliding between the first rails 115. In embodiments where the first rails 115 are laterally separated by a dimension that is less than the diameter of the body 422 (i.e. as in FIG. 4) of a water bottle 420, the water bottle 420 rests on the object abutment portion 350, preventing the first rails 115 from interacting with the water bottle 420 and damaging it. Details of a non-limiting embodiment wherein the optional lining portion 150 comprises the object abutment portion 350 are depicted in FIG. 6, with a water bottle 420 depicted in outline representing where the water bottle 420 would rest when placed on the optional lining portion 150, similar to FIG. 5.

In some embodiments, the object abutment portion 350 may comprise a material similar to the material of the lining portion 150, as described above (for example in embodiments where the lining portion 150 comprises the object abutment portion 350). In other embodiments, the object abutment portion 350 may comprise a material similar to that of the object supporting bars 130, for example steel and/or iron and/or aluminum. In these embodiments, an object facing side of the object abutment portion 150 may further comprise a material that prevents damage to glass or plastic, such as high density polyethylene.

FIG. 5 further depicts the interaction between the water bottle 420' and the handle portion 140b. A person of skill in the art would understand that the bottle 420' is stacked on the uppermost bottle 420, and is further being prevented from sliding off the hand cart 100 as the handle portion 140b is of a configuration that causes at least a portion of the handle portion 140b to abut the water bottle 420'. Hence, in these embodiments, the handle portion 140b has a function similar to that of the object abutment portion 350, and is accordingly configured with a suitable shape, such as the curved/hooped shape depicted in FIG. 5.

FIG. 5 further depicts the interaction of the wheel assembly 145 with the first rail 115. From this view, a person of skill in the art would understand that the wheel assembly 145 comprises at least an axle 520. The wheel assembly 145 may further comprise at least two wheels 510, the wheels 510 free to rotate about the axle 520, and the axle 520 attached to the wheel end 126 of each of the first rails 115 via at suitable fastener assemblies 530. As such the wheel assembly 145 provides additional stability between the two first rails 115. In some embodiments, the wheel assembly structurally joins the two first rails 115, for additional support and stability between the frame portions 110. In some embodiments, during manufacture, the hand truck 100 may be assembled without the wheels 510, shipped to a second location, and the wheels 510 attached.

While the hand cart 100 has been described in specific embodiments with reference to the plurality of objects being water bottles, such as water bottles 420 and/or the water bottle 420', it is understood that the type of object is not to be considered particularly limiting and that the hand cart 100 may be enabled to transport a plurality of objects other than water bottles. For example, the hand cart 100 may be enabled to transport boxes, kegs of beer, and the like, the object supporting distance 132, the object stacking distance 138, and the object lining portion 150, if present, being configured accordingly.

Further, while in specific embodiments the hand truck 100 is enabled to transport the plurality of objects when a longitudinal axis of the plurality of objects are substantially parallel to the object supporting bars 130, in other embodiments the hand truck 100 may be enabled to transport the plurality of objects when the longitudinal axis of the plurality of objects are substantially perpendicular to the object supporting bars 130. For example, it may be desired to enable the hand truck 130 to transport spools of wire, which are also awkward and heavy, and further to transport the spools of wire in a manner that conveniently allows a user to unspool wire from each spool. Hence, in these embodiments, each pair of object supporting bars 130, such as the pair 135 in FIG. 1, enabled to support a spool oriented perpendicularly between them. For example, each spool may comprise supporting portions that extend longitudinally from the center of the spool, and each object supporting bar 130 may be configured with generally aligned mating portions for receiving the supporting portions, for example an aperature (as in FIG. 7), a groove, a kink and the like in the object supporting bar 130, such that the longitudinal axis of the spool rests perpendicular to the that object supporting bars, and enable the spool to spin about the supporting portions when wire is unspooled.

Figure 7:
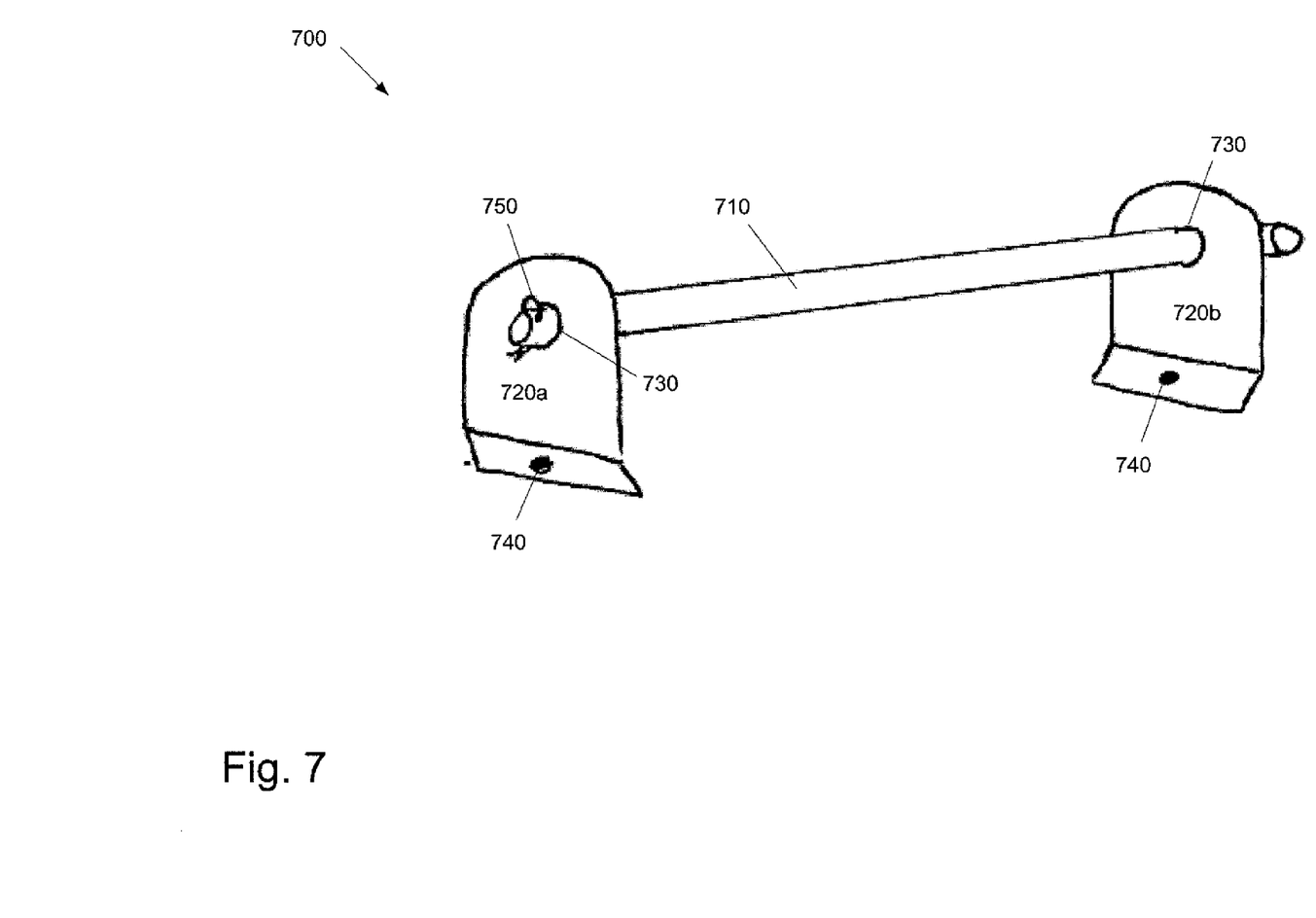
FIG. 7 depicts a perspective view of a spool supporting apparatus for a hand truck for transporting a plurality of objects, according to a non-limiting embodiment.

Alternatively, as depicted in FIG. 7, a spool supporting apparatus 700 may comprise a spool threading portion 710, such as a dowel of a suitable material (e.g. wood and/or metal) and a pair of tabs 720a and 720b, each of which is provided with a first aperture 730 (or slot, groove, kink, and the like) for accepting the spool threading portion 710. Each of the tabs 720a and 720b are further adapted for aligned attachment to an object supporting bar 130 in a pair of object supporting bars 130. For example, in the depicted embodiment, each tab 720a and 720b further comprises at least a second aperture 740 for attaching the pair of tabs 720a and 720b to a pair of object supporting bars 130 (such as the pair 135 in FIG. 1) via a nut and bolt assembly, and the like. Alternatively, the pair of tabs 720a and 720b may be attached to a pair of object supporting bars 130 via a weld, and the like. In any event, when the tabs 720a and 720b are alignedly attached to a pair of object supporting bars 130, the tabs 720a and 720b extend generally upwards such that the first apertures 730 are aligned. In some embodiments, the portion of the tabs 720a and 720b which define the second aperture 740 (and/or the area to be welded) may be at an angle (e.g. approximately 90°) to enable the tabs 720a and 720b to extend generally upwards (or downwards) from the object supporting bar 130 to which each are attached. Hence the spool threading portion 710 may be inserted into each of the first apertures 730 such that the tabs 720a and 720b support the spool threading portion 710, and any spool which is threaded onto the spool threading portion 710. In some embodiments, the spool supporting portion 700 may further comprise apparatus 750 for removably attaching the spool threading portion 710 to the tabs 720a and 720b (such as a cotter pin and the like), each end of the spool threading portion 710 enabled to accept the apparatus 750. In some embodiments, the spool threading portion 710 may be hingedly attached to one of the object supporting bars 30 in the pair, or a tab 720a or 720b, and enabled to rest on the other of the object supporting bars 30 in the pair, or the other of the tabs 720b or 720a.

Figure 8:
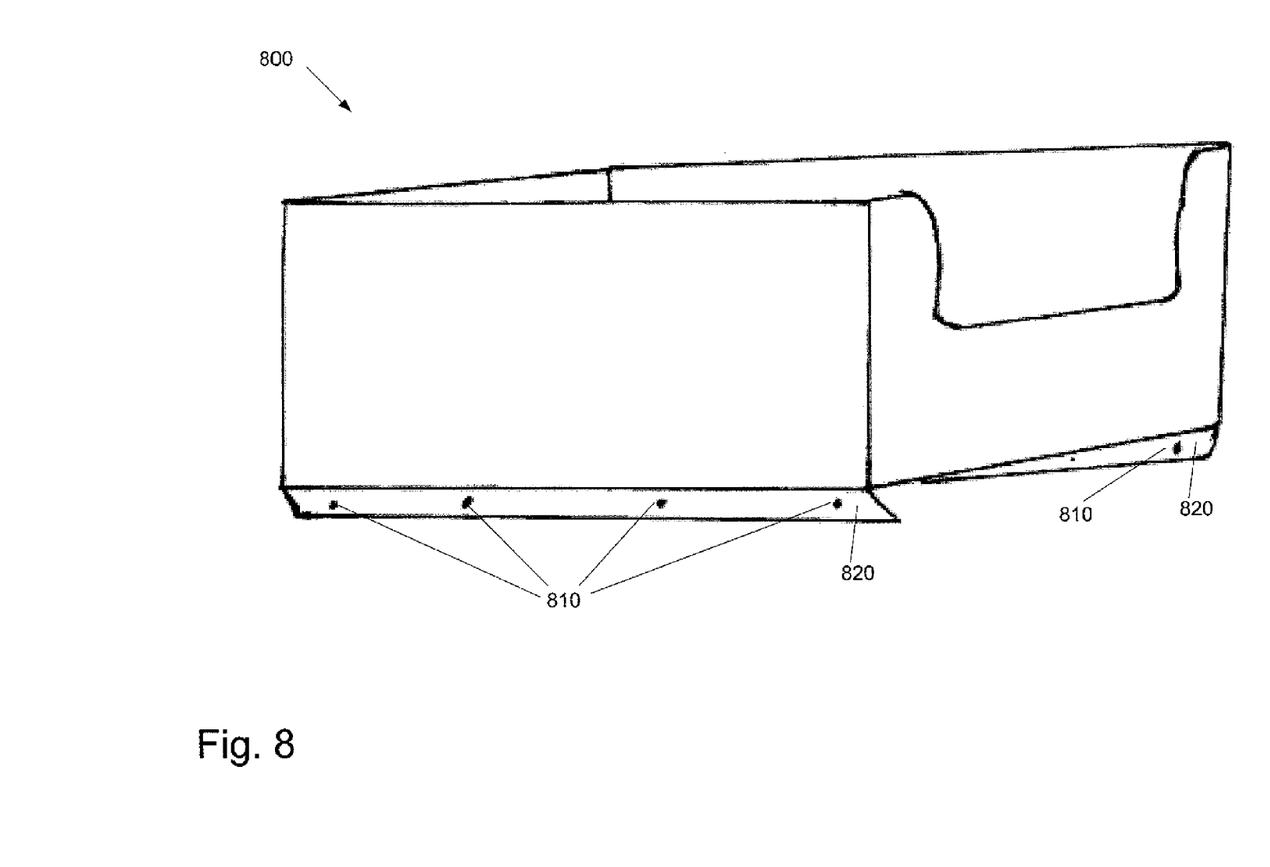
FIG. 8 depicts a perspective view of a box adapted for attachment to a pair of object supporting bars of a hand truck for transporting a plurality of objects, according to a non-limiting embodiment.

FIG. 8 depicts a box 800 adapted for attachment to a pair of object supporting bars 130 (such as the pair 135 in FIG. 1), for example via apertures 810 in tabs 820, the tabs 820 separated by a distance similar to the distance separating a pair of object supporting bars 135. Hence the box 800 may be attached to a pair of object supporting bars 130 via nut and bolt assemblies, and the like, via the apertures 810. Alternatively, the box 800 may be attached to a pair of object supporting bars 130 via a weld, and the like. Hence, if the hand truck 100 is equipped with a box 800, or a plurality of boxes each similar to the box 800, the hand truck 800 may be used to transport a plurality of objects which have been inserted into the box 800 or the plurality of boxes.

Figure 9:
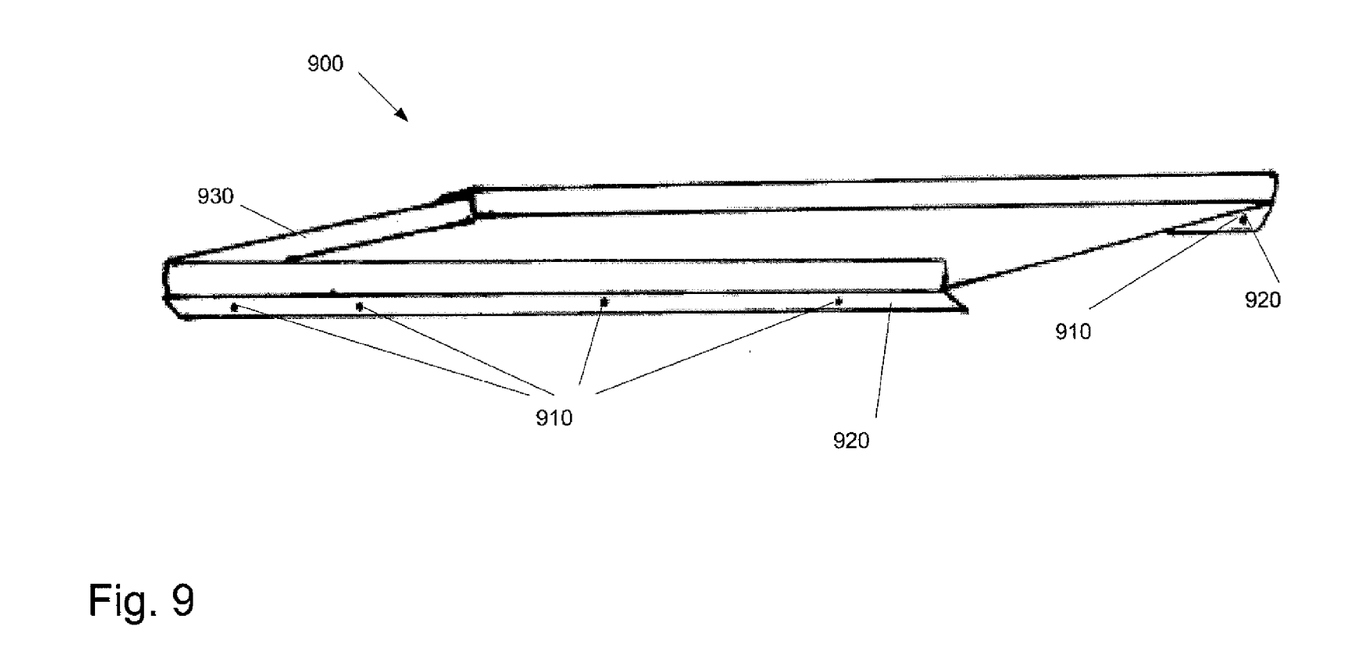
FIG. 9 depicts a perspective view of a tray adapted for attachment to a pair of object supporting bars of a hand truck for transporting a plurality of objects, according to a non-limiting embodiment.

FIG. 9 depicts a tray 900 adapted for attachment to a pair of object supporting bars 130 (such as the pair 135 in FIG. 1), for example via apertures 910 in tabs 920, similar to apertures 810 and tabs 820 described above. Hence the tray 900 may be attached to a pair of object supporting bars 130 via nut and bolt assemblies, and the like, via the apertures 910. Alternatively, the tray 900 may be attached to a pair of object supporting bars 130 via a weld, and the like. Hence, if the hand truck 100 is equipped with a tray 900, or a plurality of trays each similar to the tray 900, the hand truck 900 may be used to transport a plurality of objects which have been placed onto the tray 900 or the plurality of trays. The tray 900 may further comprise a rear lip 930 for preventing objects from sliding off the tray 900 when the hand truck 100 is tilted for transport.

In some embodiments, the hand truck 100 is configurable, such that each pair of object supporting bars 135 may be configured with a lining portion 150, a spool supporting portion 700, a box 800 or a tray 900. Hence the hand truck 100 may be configured to transport a plurality of objects of different types. Other types of object transporting apparatus that may be attached to the object supporting bars 130 may occur to a person of skill in the art and are within the scope of present embodiments.

Structural joins between the various elements of the hand cart 100 have been described in specific non-limiting embodiments with reference to welds and fasteners, however in other non-limiting embodiments, the structural joins between various elements of the hand cart 100 may be hinged structural joins. Such hinged structural joins enable the hand cart 100 to be folded up such that the first rail 115 and the second rail 120 are substantially parallel and adjacent, and the object supporting bars 130 fold towards the first rail 115. In a particular non-limiting embodiment, each of the object supporting bars is hingedly attached to the object side face 310 of the first rail 115, and when the hand cart 100 is in an open position, rests on a pin extending from the second rail 120, such that the second rail 120 structurally supports an object supporting bars 130 via the pin. In some of these embodiments, each object support bar 130 may further comprise a groove for receiving the pin to frictionally couple the object supporting bar 130 to the second rail 115, providing additional stability to the hand cart 100, when the hand cart 100 is in an open position.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A hand truck for transporting a plurality of objects, comprising,
a first frame portion and a second frame portion, each of which comprises:
a first rail and a second rail, structurally joined proximal a handle end of each said rail; and
a plurality of object supporting bars extending from said first rail to said second rail, each of said plurality of object supporting bars structurally supported by said first rail and said second rail, and separated from an adjacent object supporting bar by a distance approximate a stacking dimension of one of the plurality of objects,
said second frame portion laterally spaced from said first frame portion by an object supporting distance, such that said plurality of object supporting bars of said first frame portion and said plurality of object supporting bars of said second frame portion form a plurality of pairs of object supporting bars, each of said plurality of pairs of object supporting bars being substantially parallel and enabled to support at least one of the plurality of objects when the hand truck is in an upright position;
a handle portion proximal to, and structurally joining, a handle end of said first frame portion and a handle end of said second frame portion; and
a wheel assembly joining said distal ends of each of said first rails of each of said first frame portion and said second frame portion.

2. The hand truck of claim 1, wherein a wheel end of said first rail is separated from a supporting end of said second rail by a hand truck supporting distance, each of said wheel end of said first rail and said supporting end of said second rail distal from said handle end, said hand truck supporting distance comprising a distance that enables the hand truck to freely stand when the hand truck is in an upright position, the hand truck being supported by said wheel assembly and said supporting ends of each said second rail.

3. The hand truck of claim 2, wherein said supporting end of each said second rail of said first frame portion and said second frame portion are structurally joined by a toe strip.

4. The hand truck of claim 1, wherein each of said plurality of object supporting bars are structurally joined to said first rail and said second rail.

5. The hand truck of claim 1, wherein for each of said first frame portion and said second frame portion, said first rail and said second rail form an angle, a narrow end of said angle located proximal said handle end of each said rail, a wide end of said angle formed by a wheel end of said first rail and a supporting end of said second rail.

6. The hand truck of claim 1, wherein for each of said first frame portion and said second frame portion, said first rail and said second rail are structurally joined proximal said handle end of each said rail by one of said plurality of object supporting bars.

7. The hand truck of claim 1, wherein for each of said first frame portion and said second frame portion, said first rail and said second rail are structurally joined proximal said handle end of each said rail by at least one of a structural fastener and a weld.

8. The hand truck of claim 1, wherein for each of said first frame portion and said second frame portion, said first rail and said second rail are structurally joined proximal said handle end of each said rail by a joining portion which substantially separates said first rail and said second rail at said handle end of each said rail.

9. The hand truck of claim 8, wherein said first rail and said second rail are substantially parallel.

10. The hand truck of claim 1, wherein each of said plurality of pairs of object supporting bars are joined by a lining portion adapted to accept and support said one of the plurality of objects, the weight of said one of the plurality of objects being translated to the first frame portion and the second frame portion by at least one of a pair of the object supporting bars and an associated lining portion.

11. The hand truck of claim 10, wherein said lining portion comprises a belly strap extending between each of said plurality of pairs of object supporting bars, said belly strap for engaging at least a portion of said one of the plurality of objects.

12. The hand truck of claim 10, wherein each of the plurality of objects comprises at least one of glass and plastic, and said lining portion is enabled to prevent damage to said glass and plastic.

13. The hand truck of claim 12, wherein said lining portion comprises a plastic material.

14. The hand truck of claim 12, wherein said lining portion comprises at least one of high density polyethylene (HDPE), polyvinyl chloride (PVC) and Kevlar.

15. The hand truck of claim 10, wherein said lining portion comprises a flexible lining portion enabled to grip said one of the plurality of objects.

16. The hand truck of claim 10, wherein each of the plurality of objects comprise a five gallon water bottle.

17. The hand truck of claim 10, wherein said lining portion comprises an object abutment portion extending from an end adjacent said first rail, said object abutment portion for preventing said one of the plurality of objects from sliding towards said first rail of each of said first frame portion and said second frame portion.

18. The hand truck of claim 1, wherein each of said plurality of object supporting bars is tilted towards said handle end of said first rail, forming an acute angle with said first rail, such that said one of the plurality of objects slides towards said first rail when supported by one of said plurality of pairs of object supporting bars, when the hand truck is in an upright position.

19. The hand truck of claim 1, wherein each of said plurality of object supporting bars comprises an object abutment portion extending from an end adjacent said first rail, said object abutment portion for preventing said one of the plurality of objects from sliding towards said first rail of each of said first frame portion and said second frame portion.

20. The hand truck of claim 1, further comprising a second handle portion proximal to, and structurally joining, a handle end of said first frame portion and a handle end of said second frame portion, wherein said handle portion enables a user to apply a moment of force to the handcart to disengage said supporting ends of each said second rails from the ground and ergonomically transport the hand cart via said wheel assembly when the hand cart is in a substantially upright position, and said second handle portion enables a user to ergonomically transport the hand cart via said wheel assembly when the hand cart is in a substantially tilted position.

21. The hand cart of claim 20, wherein when said one of the plurality of objects is supported by an uppermost pair of object supporting bars, said second handle portion is further enabled to prevent another one of the plurality of objects stacked on said one of the plurality of objects from sliding between said first rail of each of said first frame portion and said second frame portion.

22. The hand cart of claim 1, wherein said plurality of pairs of object supporting bars comprises a bottommost pair extending from said wheel end of each said first rail, an uppermost pair extending proximal said handle end of each said first rail, and at least two middle pairs evenly spaced between said bottommost pair and said uppermost pair.

23. The hand truck of claim 1, wherein said first frame portion and said second frame portion comprise at least one of steel and aluminum.

24. The hand truck of claim 1, wherein said first rail and said second rail are structurally joined proximal a handle end of each said rail via a hinge, and said plurality of object supporting bars extending from said first rail to said second rail are structurally joined to said first rail via another hinge.

25. The hand truck of claim 1, further comprising at least one of a lining portion, a spool supporting portion, a box or a tray extending between at least one of said pairs of object supporting bars.

* * * * *